(12) United States Patent
Jang

(10) Patent No.: US 7,325,172 B2
(45) Date of Patent: Jan. 29, 2008

(54) FAILSAFE RLC RESET METHOD FOR A WIRELESS COMMUNICATION SYSTEM

(75) Inventor: Sung-Kyung Jang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 10/735,768

(22) Filed: Dec. 16, 2003

(65) Prior Publication Data

US 2004/0153896 A1   Aug. 5, 2004

(30) Foreign Application Priority Data

Feb. 4, 2003   (KR)   .................. 10-2003-0006788

(51) Int. Cl.
G11B 20/20   (2006.01)
(52) U.S. Cl. .............. 714/700; 455/502; 714/748
(58) Field of Classification Search ........... 370/468, 370/411; 714/700
See application file for complete search history.

(56) References Cited

U.S. PATENT DOCUMENTS

| | | | | |
|---|---|---|---|---|
| 3,409,889 | A * | 11/1968 | Graham | 342/88 |
| 6,862,450 | B2 * | 3/2005 | Mikola et al. | 455/438 |
| 6,987,981 | B2 * | 1/2006 | Kuo | 455/502 |
| 7,171,224 | B2 * | 1/2007 | Sarkkinen et al. | 455/502 |
| 2003/0091048 | A1 * | 5/2003 | Jiang | 370/392 |
| 2003/0117997 | A1 * | 6/2003 | Kim | 370/350 |
| 2003/0157927 | A1 * | 8/2003 | Yi et al. | 455/411 |
| 2003/0177437 | A1 * | 9/2003 | Wu | 714/776 |
| 2003/0206534 | A1 * | 11/2003 | Wu | 370/328 |
| 2003/0236085 | A1 * | 12/2003 | Ho | 455/411 |
| 2004/0042491 | A1 * | 3/2004 | Sarkkinen et al. | 370/469 |
| 2004/0203623 | A1 * | 10/2004 | Wu | 455/412.1 |
| 2004/0203971 | A1 * | 10/2004 | Kuo | 455/517 |
| 2006/0154603 | A1 * | 7/2006 | Sachs et al. | 455/39 |
| 2006/0189272 | A1 * | 8/2006 | Willenegger et al. | 455/3.01 |

* cited by examiner

Primary Examiner—Jacques Louis-Jacques
Assistant Examiner—Sam Rizk
(74) Attorney, Agent, or Firm—Ked & Associates, LLP

(57) ABSTRACT

Embodiments of the present invention relate to a method. The method includes synchronizing a first device and a second device. If the first device and the second device both initiate the synchronizing at substantially the same time, then the first device and/or the second device may compensate for synchronization errors. In other words, when two devices begin communication, one or both the devices may perform a procedure which causes the two devices to successfully synchronize. Accordingly, when the two devices are synchronized they will be able to communicate. However, if both devices initiate synchronization at substantially the same time, absent additional measures, the two devices may not be synchronized. Accordingly, in embodiments of the present invention, these synchronization errors are compensated for, if a first and second device both initiates a synchronization procedure at substantially the same time.

28 Claims, 6 Drawing Sheets

FIG.1
BACKGROUND ART

| D/C | PDU Type | RSN | R1 | Oct 1 |

HFNI

HFNI

HFNI

PAD

Oct N

FAILSAFE RLC RESET METHOD FOR A WIRELESS COMMUNICATION SYSTEM

BACKGROUND OF THE INVENTION

1. Field of the Invention

Embodiments of the present invention generally relates to communications.

2. Background of the Related Art

Mobile radio communication systems are used in everyday life. Garage door openers, remote controllers for home entertainment equipment, cordless telephones, hand-held walkie-talkies, pagers, and cellular telephones are all examples of mobile radio communication systems. For example, cellular radio systems provide high quality service that is often comparable to that of a landline telephone system.

In wireless communication systems it may be necessary for two wireless devices to synchronize. Synchronization generally refers to two devices being configured so they can actively communicate with each other. Specifically, when one device transmits data at a particular time, the second device is configured to receive that data at a specific predetermined time. In other words, for two devices to communicate, synchronization is necessary so that one device can operate in anticipation of another device. If synchronization is not accomplished, two devices cannot communicate with each other. Accordingly, the two devices will not be able to perform their intended function.

SUMMARY OF THE INVENTION

Embodiments of the present invention relate to a method. The method includes synchronizing a first device and a second device. If the first device and the second device both initiate the synchronizing at substantially the same time, then the first device and/or the second device may compensate for synchronization errors. In other words, when two devices begin communication, one or both the devices may perform a procedure which causes the two devices to successfully synchronize. Accordingly, when the two devices are synchronized they will be able to communicate. However, if both devices initiate synchronization at substantially the same time, absent additional measures, the two devices may not be synchronized. Accordingly, in embodiments of the present invention, these synchronization errors are compensated for, if a first and second device both initiates a synchronization procedure at substantially the same time.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 1 is an exemplary drawing illustrating a RESET PDU/RESET ACK PDU format of an UE-UTRAN interface.

DETAILED DESCRIPTION OF PREFERRED EMBODIMENTS

Figure 2:
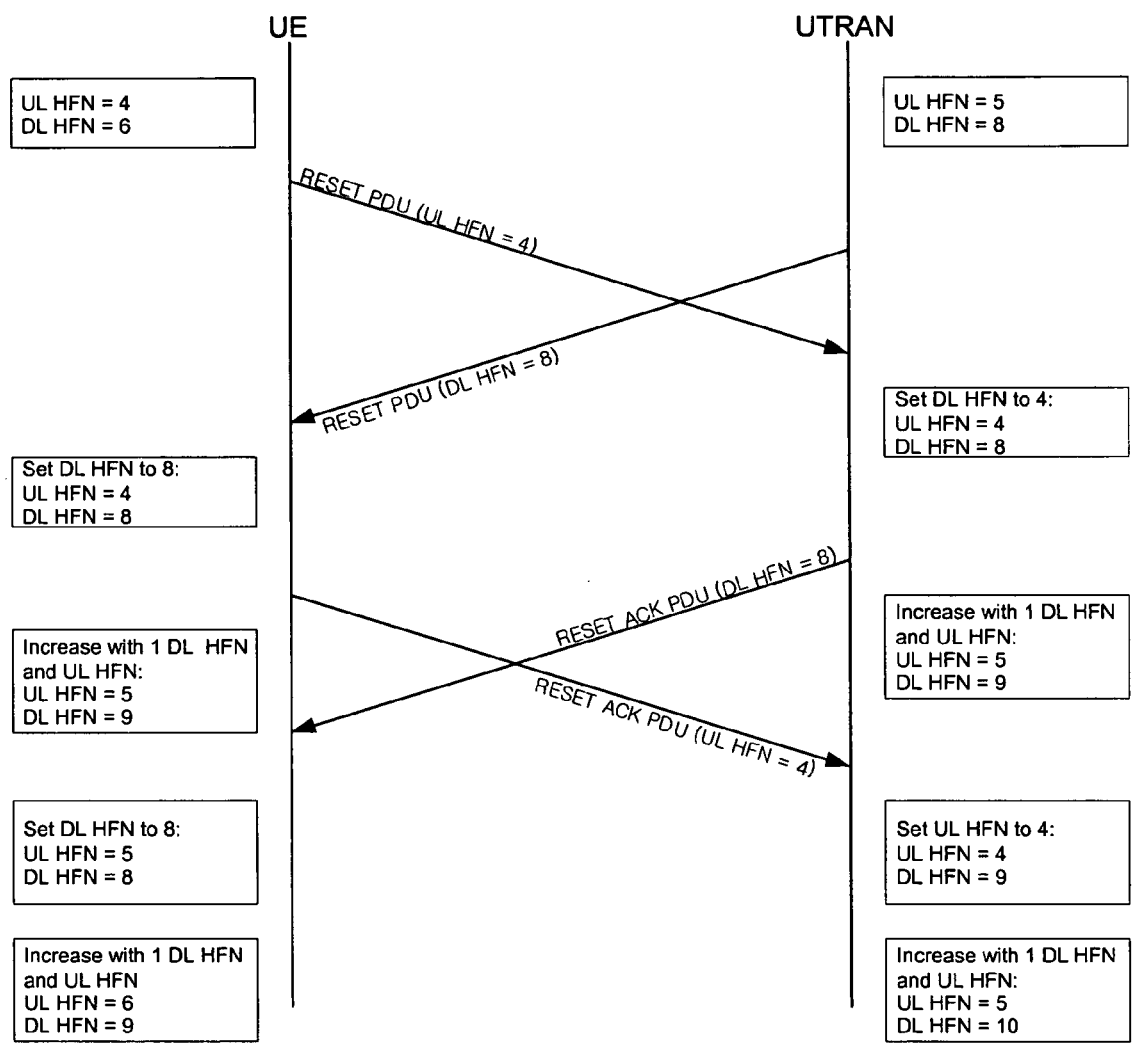
FIG. 2 is an exemplary view illustrating an RLC reset procedure when two peer entities transmit RESET PDUs nearly simultaneously.

Radio Link Control (RLC) is a protocol for a user equipment-UMTS Terrestrial Radio Access Network (UE-UTRAN) radio interface in a mobile communication system. The RLC sublayer may include three RLC entities: a Transparent Mode (TM) entity, an Unacknowledged Mode (UM) entity, and an Acknowledged Mode (AM) entity. Among them, the peer AM entities of the Sender and Receiver exchange control information using control Protocol Data Units (PDUs) such as STATUS PDU, piggybacked STATUS PDU, RESET PDU, and RESET ACK PDU. The RESET PDU may be used to reset all protocol states, protocol variables, and protocol timers of the peer RLC entity in order to synchronize the two peer entities. The RESET PDU may be sent by a Sender to a Receiver. A RESET ACK PDU may be an acknowledgement to a RESET PDU. A RESET ACK PDU may be sent by a Receiver to the Sender.

As illustrated in exemplary FIG. 1, a RESET PDU/RESET ACK PDU may include: A 1-bit D/C field indicating the type of an AM PDU. A 3-bit PDU Type field indicating the Control PDU type. A one-bit reset sequence number (RSN) field indicating the sequence number of the transmitted RESET PDU. A 3-bit reserved (R1) field to have a multiple of 8 bits in length. A 20-bit Hyper Frame Number Indicator (HFNI) field for indicating the hyper frame number (HFN). Padding (PAD).

A RSN field may be used to indicate a sequence number of a transmitted RESET PDU. If this RESET PDU is a retransmission of an original RESET PDU, then the retransmitted RESET PDU may have the same RSN value as the original RESET PDU. Otherwise the retransmitted RESET PDU may have an incremented RSN value. The initial value of the RSN field may be zero. The value of the RSN field may be reinitialized when the RLC is re-established. However, it may not be reinitialized when the RLC is reset. A HFNI field may be used to indicate a HFN to a peer entity. With the aid of the HFNI field, the HFN in UE and UTRAN may be synchronized.

The size of a RESET PDU/RESET ACK PDU may be variable and may be upper bounded by the maximum RLC PDU size used by the logical channel on which the control PDUs are sent. Padding may be included to match one of the PDU sizes used by the logical channel on which the control PDUs are sent. The length of the RESET PDU/RESET ACK PDU may be a multiple of 8 bits.

The RLC reset procedure may be used to reset two RLC peer entities, which are operating in acknowledged mode. During the reset procedure a HFN in UTRAN and UE may be synchronized. Two HFNs may be used for ciphering needs during synchronization; for example DL HFN in downlink and UL HFN in uplink. In a reset procedure, the highest UL HFN and DL HFN used by the RLC entity, in the transmitting sides, may be exchanged between UE and UTRAN. RESET PDUs and RESET ACK PDUs may have higher priority than AM PDUs.

The RLC reset procedure may be initiated when MaxDAT (maximum value for the number of retransmissions of an AM PDU) is reached. Move Receiving Window (MRW) command may send state variable VT(MRW) that is equal to the maximum value for the number of retransmissions of the MaxMRW command. A STATUS PDU may include "erroneous Sequence Number" received.

If a RLC reset procedure is initiated, a sender may stop transmitting a AM PDU or a STATUS PDU, submit a RESET PDU to a lower layer, start a timer Timer_RST, and/or increase a reset state variable VT(RST). When a RLC reset procedure has been initiated, the procedure may only be ended upon reception of a RESET ACK PDU with the same RSN value as in the corresponding RESET PDU. Alternatively, a RLC reset procedure may be ended upon request of re-establishment or release from an upper layer. A reset procedure may not be interrupted by the reception of a reset PDU from a peer entity.

A sender may set a HFNI field to a currently highest used HFN (DL HFN when a RESET PDU is sent by UTRAN or UL HFN when a RESET PDU is sent by the UE). A sender may set a RSN field to a sequence number of a RESET PDU. A sequence number of a first RESET PDU after the AM entity is established or re-established may be 0. This sequence number may be incremented every time a new RESET PDU is transmitted, but not when a RESET PDU is retransmitted. Upon reception of a RESET PDU the receiver may only submit a RESET ACK PDU to the lower layer with the contents set exactly as the last transmitted RESET ACK PDU (e.g., in this case the RLC entity is not reset) if the RSN value in the RESET PDU is the same as the RSN value in the last received RESET PDU.

If the RESET PDU is the first RESET PDU received since the entity was re-established or the RSN value is different form the RSN value in the last received RESET PDU, the receiver may submit a RESET ACK PDU to the lower layer with the content, reset the state variable, stops all timers, resets configurable parameters to their configured values, discards all RLC PDUs in the receiving side of the AM RLC entity, discard all RLC PDUs that were transmitted before the reset in the transmitting side of the AM RLC entity, sets the HFN (DL HFN when the RESET PDU is received in UE or UL HFN when the RESET PDU is received in UTRAN) equal to the HFNI field in the received RESET PDU, and/or increases with one the UL HFN and DL HFN. The updated HFN values may be used for the first transmitted and received AMD PDUs after the reset procedure.

Upon reception of a RESET ACK PDU in response to the RESET PDU, the sender may set the HFN value (DL HFN when the RESET ACK PDU is received in UE or UL HFN when the RESET ACK PDU is received in UTRAN) to the HFNI field of the received RESET ACK PDU, reset the state variables, stop all the timers, reset configurable parameters to their configured values, discard all RLC PDUs in the receiving side of the AM RLC entity, discard all RLC PDUs that were transmitted before the reset in the transmitting side of the AM RLC entity, and/or increase by one the UL HFN and DL HFN. If the sender has already transmitted a RESET PDU, which has not yet been acknowledged by a RESET ACK PDU, the received RSN value may be the same as the one in the corresponding RESET PDU.

If the sender has already transmitted a RESET PDU which has not yet been acknowledged by a RESET ACK PDU and the received RSN value is not the same as the one in the corresponding RESET PDU, the sender may discard the RESET ACK PDU. If the sender has not transmitted a RESET PDU which has not yet been acknowledged by a RESET ACK PDU, the sender may discard the RESET ACK PDU. However, in a RLC reset procedure, such as the one illustrated in FIG. 2, the synchronization of the two peer entities may fail if the two RLC peer entities transmit the RESET PDU at substantially the same time.

As shown in FIG. 2, the UL HFN and DL HFN of the UE are exemplary set at 4 and 6, respectively for exemplary purposes. Likewise, the UL HFN and the DL HFN of the UTRAN are exemplary set at 5 and 8, respectively for exemplary purposes. In this example, since the UL HFN and DL HFN of the UE do not match with the UL HFN and DL HFN of the UTRAN, the UE and UTRAN initiate the RLC reset procedure nearly simultaneously. In this example, UE may transmit a RESET PDU with UL HFN=4. Further, the UTRAN may transmit a RESET PDU with DL HFN=8 before receiving the RESET PDU from the UE. Upon reception of the UE transmitted RESET PDU, the UTRAN may set the UL HFN to 4 equal to the HFNI field in the UE transmitted RESET PDU and increment by 1 the UL HFN and DL HFN such that the UL HFN and the DL HFN of the UTRAN become 5 and 9, respectively.

In this example, upon reception of the UTRAN transmitted RESET PDU, the UE may set the DL HFN to 8 equal to the HFNI field in the UTRAN transmitted RESET PDU. Further, the UE may increment by 1 the UL HFN and DL HFN such that the UL HFN and the DL HFN of the UE become 5 and 9, respectively. Sequentially, the UL HFN and DL HFN of the UE may match the UL HFN and DL HFN of the UTRAN until the UE and the UTRAN receive the respective UTRAN and UE transmitted RESET ACK PDUs in response to the corresponding RESET PDUs.

In this example, the UTRAN may transmit the RESET ACK PDU with DL HFN=8 in response to the UE transmitted RESET PDU. Upon reception of the UTRAN transmitted RESET ACK PDU, the UE may set the DL HFN to 8 equal to the HFNI field in the UTRAN transmitted RESET ACK PDU. Further, the UE may increment by 1 the UL HFN and DL HFN such that the UL HFN and DL HFN of the UE become 6 and 9, respectively. In a similar manner, the UE transmit the RESET ACK PDU with DL HFN=4 in response to the UTRAN transmitted RESET PDU. Upon reception of the UE transmitted RESET ACK PDU, the UTRAN may set the UL HFN to 8 equal to the HFNI field in the UE transmitted RESET ACK PDU. Further, the UTRAN may increment by 1 the UL HFN and DL HFN such that the UL HFN and DL HFN of the UTRAN become 5 and 10, respectively.

As a result of the RLC reset procedure exemplified in FIG. 2, the UL HFN and DL HFN of the UE may become 6 and 9 (UL HFN=6, DL HFN=9) and the UL HFN and DL HFN of the UTRAN may become 5 and 10 (UL HFN=5, DL HFN=10). Accordingly, in this example, the synchronization of the RLC peer entities of the UE and UTRAN fail. As a result of this failure, two communication devices may not be able to communicate.

In an exemplification of embodiments of the present invention in FIGS. 3-6, it may be assumed for exemplary purposes that UE side UL HFN and DL HFN are initially 4 and 6 and UTRAN side UL HFN and DL HFN are initially 5 and 8. Also, it may be assumed for exemplary purposes that both the UE and UTRAN initiate RLC reset procedures for synchronizing the RLC peer entities.

Figure 3:
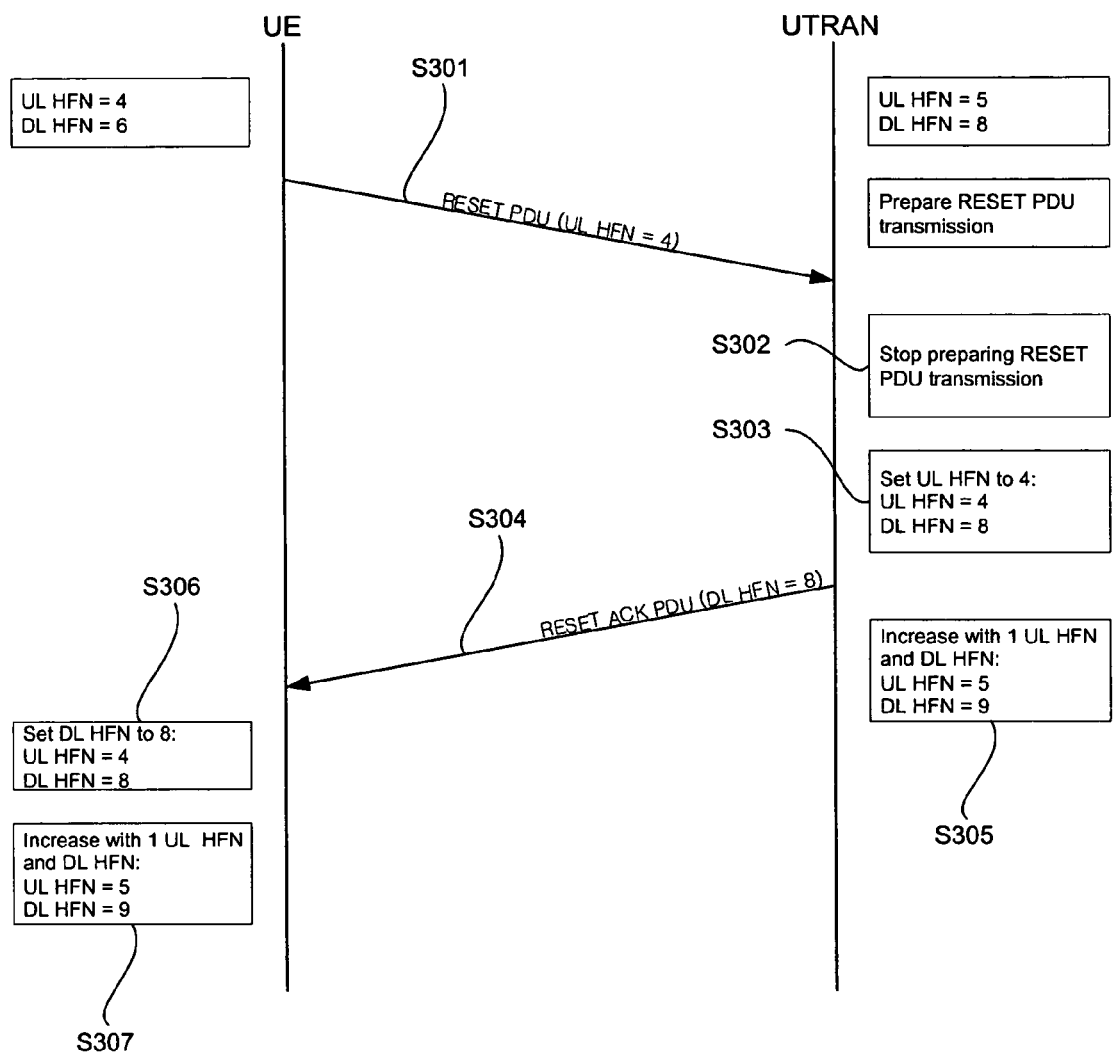
FIGS. 3-6 are exemplary flowcharts illustrating failsafe RLC reset methods.

FIG. 3 is an exemplary message flowchart illustrating a failsafe RLC reset method according to embodiments of the present invention. As illustrated in FIG. 3, HFNs (UL HFN=4, DL HFN=6) of an UE are mismatched with HFNs (UL HFN=5, DL HFN=8) of a UTRAN. Since the two HFNs of the UE and UTRAN needs to be synchronized for ciphering, the two RLC peer entities of the UE and the UTRAN may both initiate RLC reset procedures.

In FIG. 3, the UE may transmit a RESET PDU with UL HFN=4 (S301) to the UTRAN. The UTRAN may receive this RESET PDU from the UE before transmitting a RESET PDU to the UE. In embodiments of the present invention, the UTRAN may stop a UTRAN initiated RLC reset procedure and proceed only with the UE initiated RLC reset procedure. Accordingly, upon reception of the RESET PDU from the UE, the UTRAN may stop UTRAN initiated RLC reset procedure (S302) and sets the UL HFN to 4, which is equal to a HFNI field of the received RESET PDU (S303). Further, the UTRAN may transmit a RESET ACK PDU with DL HFN=8 in response to the corresponding RESET PDU (S304). The UTRAN may sequentially increment by 1 the UL HFN and DL HFN such that the UL HFN and DL HFN become 5 and 9, respectively (S305).

In embodiments illustrated in FIG. 3, upon reception of the RESET ACK PDU from the UTRAN, the UE may set the DL HFN to 8, which is equal to the HFNI field of the received RESET ACK PDU (S306). Further, the UE may increment by 1 the UL HFN and DL HFN such that the UE side UL HFN and DL HFN become 5 and 9, respectively (S307). As a result, the UE and UTRAN RLC peer entities are synchronized, as both the UE and UTRAN have the same UL HFN=5 and DL HFN=9. In other words, the embodiments illustrated in FIG. 3 compensate for synchronization errors.

Figure 4:
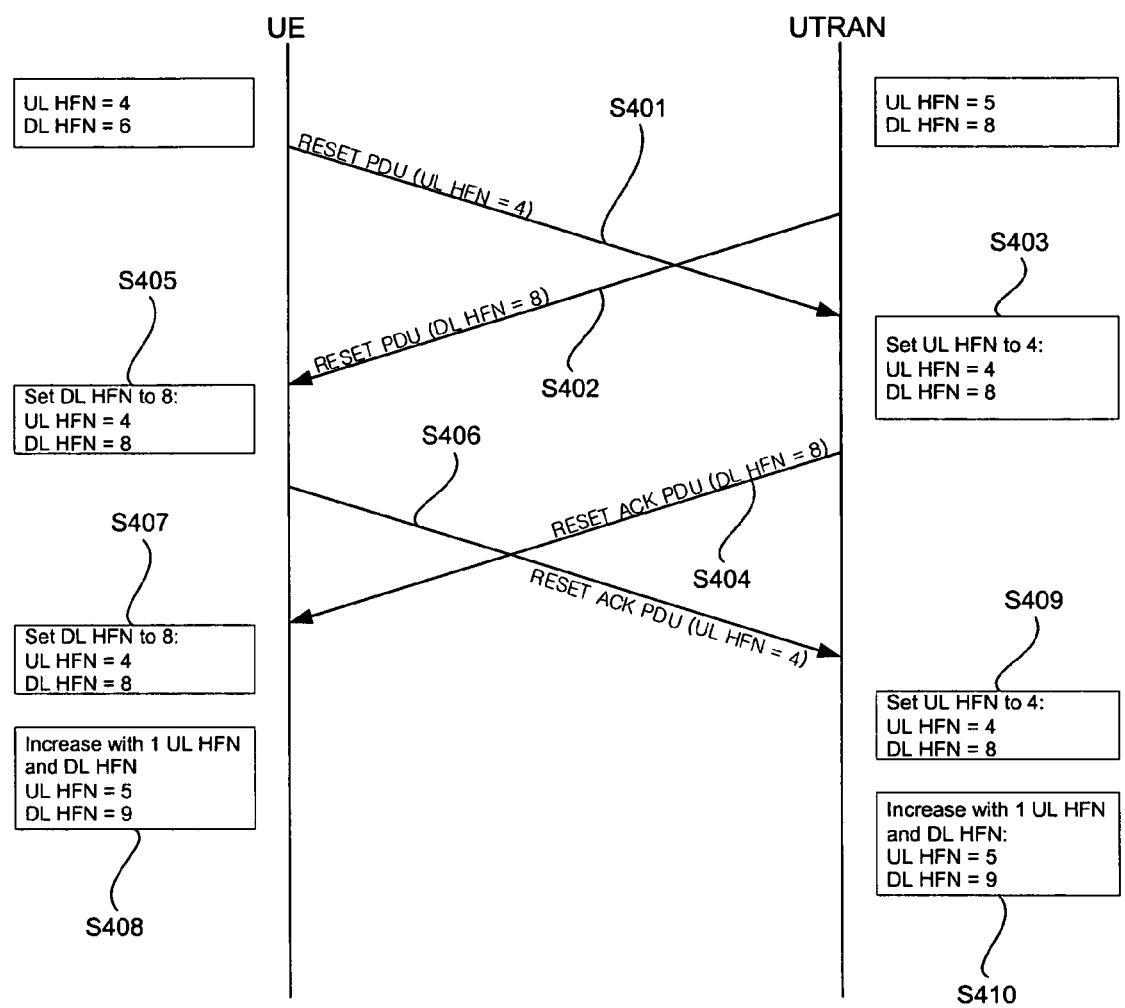

FIG. 4 is an exemplary message flowchart illustrating failsafe RLC reset methods according to embodiments of the present invention. As illustrated in FIG. 4, both the UE and UTRAN initiate RLC reset procedures. The UE first transmits an RLC RESET PDU with UL HFN=4 (S401). At substantially the same time, the UTRAN transmits a RESET PDU with DL HFN=8, before receiving the UE transmitted RESET PDU a (S402). Upon receipt of the UE transmitted RESET PDU, the UTRAN may set an UTRAN side UL HFN to 4, which is equal to the HFNI field of the UE transmitted RESET PDU. Accordingly, the UTRAN side UL HFN and DL HFN may become 4 and 8, respectively (S403). Sequentially, the UTRAN transmits an RESET ACK PDU with DL HFN=8 in response to the UE transmitted RESET PDU (S404).

In the exemplary illustration of FIG. 4, upon receipt of the UTRAN transmitted RESET PDU, the UE may set an UE side DL HFN to 8, which is equal to the HFNI field of the UTRAN transmitted RESET PDU. Accordingly, the UE side UL HFN and DL HFN may become 4 and 8, respectively (S405). Sequentially, the UE transmits an RESET ACK PDU with UL HFN=4 in response to the UTRAN transmitted RESET PDU (S406). Upon receipt of the UTRAN transmitted RESET ACK PDU, the UE may set the DL HFN to 8, which is equal to the HFNI field of the UTRAN transmitted RESET ACK PDU. Accordingly, the UE side UL HFN and DL HFN may become 4 and 8 (S407). The UE may then increment by 1 the UL HFN and DL HFN, resulting in UL HFN=5 and DL HFN=9 (S408).

In embodiments illustrated in FIG. 4, upon receipt of the UE transmitted RESET ACK PDU the UTRAN may set the UL HFN to 4, which is equal to the HFNI field of the UE transmitted RESET ACK PDU. Accordingly, the UTRAN side UL HFN and DL HFN may become 4 and 8 (S409). The UTRAN may then increment by 1 the UL HFN and DL HFN, resulting in UL HFN=5 and DL HFN=9 (S410).

In embodiments illustrated in FIG. 4, as a result of RLC reset procedures initiated by the UE and UTRAN at substantially the same time, the UE and UTRAN RLC entities may be successfully synchronized with UL HFN=5 and DL HFN=9. In other words, the embodiments exemplified in FIG. 4 compensate for synchronization errors.

Figure 5:
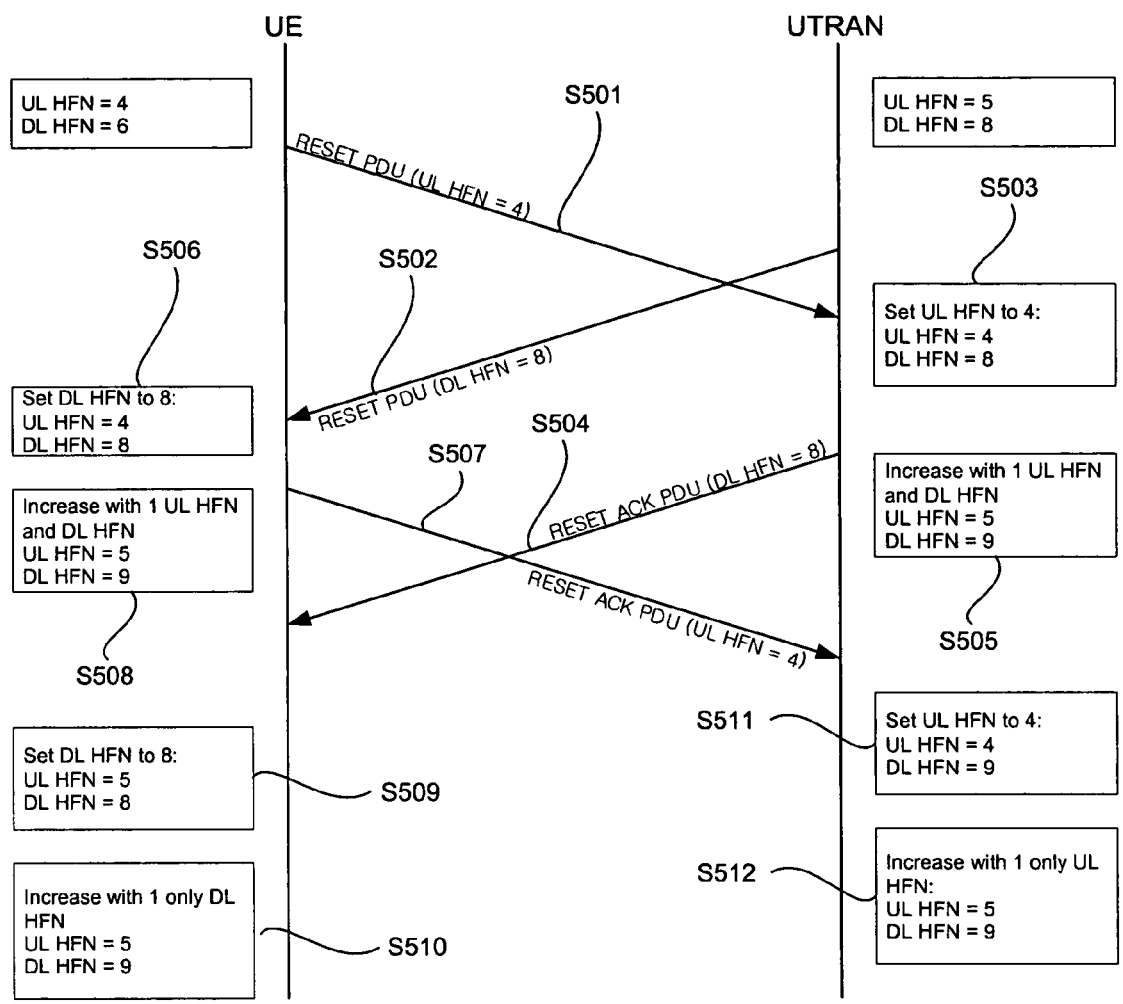

FIG. 5 is an exemplary message flowchart illustrating failsafe RLC reset methods according to embodiments of the present invention. As illustrated in FIG. 5, both the UE and UTRAN may initiate RLC reset procedures at substantially the same time. The UE may first transmit a RESET PDU with UL HFN=4 (S501). Likewise, the UTRAN may transmit a RESET PDU with DL HFN=8 before receiving the UE transmitted RESET PDU (S502). Upon receipt of the UE transmitted RESET PDU, the UTRAN may set an UTRAN side UL HFN to 4, which is equal to the HFNI field of the UE transmitted RESET PDU. Accordingly, the UTRAN side UL HFN and DL HFN may become 4 and 8, respectively (S503). After setting the UL HFN, the UTRAN may transmit an RESET ACK PDU with DL HFN=8, in response to the UE transmitted PDU (S504). The UTRAN may increment by 1 the UL HFN and DL HFN such that UL HFN=5 and DL HFN=9 (S505).

In embodiments exemplified in FIG. 5, upon receipt of the UTRAN transmitted RESET PDU, the UE may set an UE side DL HFN to 8, which is equal to the HFNI field of the UTRAN transmitted RESET PDU. Accordingly, the UE side UL HFN and DL HFN may become 4 and 8, respectively (S506). After setting the DL HFN, the UE may transmit an RESET ACK PDU with UL HFN=4 in response to the UTRAN transmitted PDU (S507) and may increment by 1 the UL HFN and DL HFN so as to be UL HFN=5 and DL HFN=9 (S508). The UE may then receive the UTRAN transmitted RESET ACK PDU. Upon reception of the UTRAN transmitted RESET ACK PDU, the UE may set the DL HFN to 8, which is equal to the HFNI field of the UTRAN transmitted RESET ACK PDU. Accordingly, the UL and DL HFN may become 5 and 8 (S509). Further, the DL HFN of the UE may be incremented by 1 and not the UL HFN of the UE, resulting in UL HFN=5 and DL HFN=9 (S510). The UTRAN may receive the UE transmitted RESET ACK PDU. Upon reception of the UE transmitted RESET ACK PDU, the UTRAN may set the UL HFN to 4, which is equal to the HFNI field of the UTRAN transmitted RESET ACK PDU. Accordingly, the UL HFN and UL HFN may become 4 and 9, respectively (S511). Further, the UL HFN of the UTRAN may then be incremented by 1 and not the DL HFN of the UTRAN, resulting in UL HFN=5 and DL HFN=9 (S512).

In the embodiments exemplified in FIG. 5, as a result of the RLC reset procedures that are initiated by the UE and UTRAN, the UE and UTRAN RLC entities are successfully synchronized with UL HFN=5 and DL HFN=9. In other words, the embodiments exemplified in FIG. 5 compensate for synchronization errors.

Figure 6:
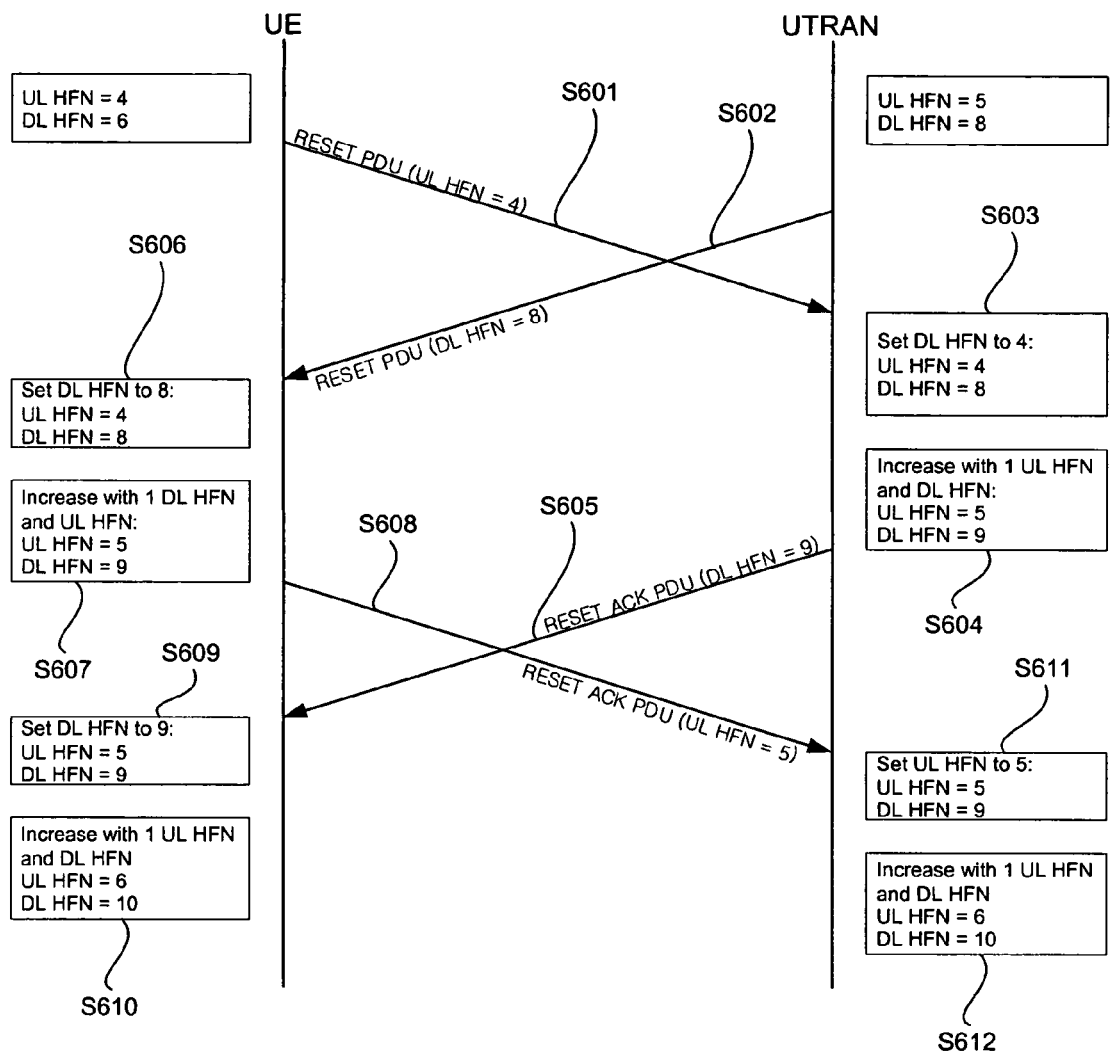

FIG. 6 is an exemplary message flowchart illustrating failsafe RLC reset methods according to embodiments of the present invention. As illustrated in FIG. 6, both the UE and UTRAN may initiate RLC reset procedures. The UE may first transmit an RESET PDU with UL HFN=4 (S601). The UTRAN may then transmit a RESET PDU with DL HFN=8 before receiving the UE transmitted RESET PDU (S602). Upon receipt of the UE transmitted RESET PDU, the UTRAN may set an UTRAN side UL HFN to 4, which is equal to the HFNI field of the UE transmitted RESET PDU. Accordingly, the UTRAN side UL HFN and DL HFN may become 4 and 8, respectively (S603). After setting the UL HFN, the UTRAN may increment by 1 the UL HFN and DL HFN so as to be 5 and 9 (S604) and may transmit a RESET ACK PDU (S605) with DL HFN=9, which is already updated.

In embodiments exemplified in FIG. 6, upon reception of the UTRAN transmitted RESET PDU, the UE may set an UE side DL HFN to 8, which is equal to the HFNI field of the UTRAN transmitted RESET PDU. Accordingly, the UE side UL HFN and DL HFN may become 4 and 8, respectively (S606). After setting the DL HFN, the UE may increment by 1 the UL HFN and DL HFN to 5 and 9 (S607), the UE may then transmit a RESET ACK PDU (S608) with UL HFN=5, which is updated.

The UE may receive the UTRAN transmitted RESET ACK PDU. Upon reception of the UTRAN transmitted RESET ACK PDU, the UE may set the DL HFN to 9, which is equal to the HFNI field of the UTRAN transmitted RESET ACK PDU. Accordingly, the UE may have UL HFN=5 and DL HFN=9 (S609). Further, the UE may increment by 1 the UL HFN and DL HFN, resulting in UL HFN=6 and DL HFN=10 (S610). The UTRAN may receive the UE transmitted RESET ACK PDU. Upon receipt of the UE transmitted RESET ACK PDU the UTRAN may set the UL HFN to 5, which is equal to the HFNI field of the UE transmitted RESET ACK PDU. Accordingly, the UTRAN may have the UL HFN=5 and DL HFN=9 (S611). The UTRAN may increment by 1 the UL HFN and DL HFN, resulting in UL HFN=6 and DL HFN=10 (S612).

In the embodiments exemplified in FIG. 6, as a result of the RLC reset procedures that are initiated by the UE and UTRAN, the UE and UTRAN RLC entities may be synchronized with UL HFN=6 and DL HFN=9. In other words, the embodiments exemplified in FIG. 6 compensate for synchronization errors.

Since failsafe RLC reset methods of embodiment of the present invention allow the RLC peer entities to successfully synchronize, even when peer entities respectively initiate RLC reset procedures nearly at the same time, it is possible to minimize synchronization failure between the peer entities. Also, the failsafe RLC reset method of embodiments of the present invention minimize the synchronization failure such that the synchronization reliability and the communication stability are improved, resulting in fast data communication.

An object of embodiments of the present invention is to provide a failsafe RLC reset method capable of improving communication stability by minimizing RLC reset failures. Another object of embodiments of the present invention is to provide a failsafe RLC reset method allowing UE and UTRAN to reliably synchronize parameters even when the UE and UTRAN initiate reset procedures at the same time.

A failsafe radio link control (RLC) reset method between two RLC peer entities in accordance with embodiments of the present invention comprise determining whether or not RLC reset is required between the two RLC peer entities, initiating, with the two RLC peer entities, respective RLC reset procedures, and synchronizing the two RLC peer entities without failure. Each of the RLC peer entities has a pair of hyper frame numbers (HFNs).

In embodiments of the present invention, initiating the respective RLC reset procedures includes, transmitting, with a first RLC peer entity, a first RESET PDU with a first RLC side first HFN, and canceling, with a second RLC peer entity, transmission of a second RESET PDU when the second RLC peer entity receives the first RESET PDU before transmitting the second RESET PDU.

In embodiments of the present invention, synchronizing the two RLC peer entities includes: setting, with the second RLC peer entity, a second RLC side first HFN to a value equal to the first RLC side first HFN; transmitting, with the second RLC peer entity, an RESET ACK PDU with a second RLC side second HFN in response to the first RESET PDU; increasing, with the second RLC peer entity, with 1 the second RLC side first HFN and a second RLC side second HFN; and setting, with the first RLC peer entity, a first RLC side second HFN to a value equal to the second RLC side second HFN upon reception of the RESET ACK PDU.

In embodiments of the present invention, initiating the respective RLC reset procedures includes: transmitting, with a first RLC peer entity, a first RESET PDU with a first RLC side first HFN; and transmitting, with a second RLC peer entity, a second RESET PDU with a second RLC side second HFN before receiving the first RESET PDU.

In embodiments of the present invention, synchronizing the two RLC peer entities includes: setting, with the second RLC peer entity, a second RLC side first HFN to a value equal to the first RLC side first HFN contained in the first RESET PDU upon reception of the first RESET PDU; transmitting, with the second RLC peer entity, a first RESET ACK PDU with a second RLC side second HFN in response to the first RESET PDU; setting, with the first RLC peer entity, a first RLC side second HFN to a value equal to the second RLC side second HFN contained in the second RESET PDU upon reception of the second RESET PDU; transmitting, with the first RLC peer entity, a second RESET ACK PDU with the first RLC side first HFN; setting, with the first RLC peer entity, the first RLC side second HFN to a value equal to the second RLC side second HFN contained in the first RESET ACK PDU upon reception of the first RESET ACK PDU; increasing, with the first RLC peer entity, the first RLC side first HFN and first RLC side second HFN; setting, with the second RLC peer entity, the second RLC side first HFN to a value equal to the first RLC side first HFN contained in the second RESET ACK PDU upon reception of the second RESET ACK PDU; and increasing, with the second RLC peer entity, the second RLC side first HFN and the second RLC side second HFN.

In embodiments of the present invention, synchronizing the two RLC peer entities includes: setting, with the second RLC peer entity, a second RLC side first HFN to a value equal to the first RLC side first HFN contained in the first RESET PDU upon reception of the first RESET PDU; transmitting, with the second RLC peer entity, a first RESET ACK PDU with a second RLC side second HFN in response to the first RESET PDU; increasing, with the second RLC peer entity, with 1 only the second RLC side first HFN; setting, with the first RLC peer entity, a first RLC side second HFN to a value equal to the second RLC side second HFN contained in the second RESET PDU upon reception of the second RESET PDU; transmitting, with the first RLC peer entity, a second RESET ACK PDU with a first RLC side first HFN in response to the second RESET PDU; increasing, with the first RLC peer entity, with 1 only the first RLC side second HFN; setting, with the first RLC peer entity, a first RLC side second HFN to a value equal to the second RLC side second HFN contained in the first RESET ACK PDU upon reception of the first RESET ACK PDU; increasing, with the first RLC peer entity, with 1 only the first RLC side second HFN; setting, with the second RLC peer entity, the second RLC side first HFN to a value equal to the first RLC side first HFN contained in the second RESET ACK PDU upon reception of the second RESET ACK PDU; and increasing, with the second RLC peer entity, with 1 only the second RLC side first HFN.

In embodiments of the present invention, synchronizing the two RLC peer entities includes: setting, with the second RLC peer entity, a second RLC side first HFN to a value equal to the first RLC side first HFN contained in the first RESET PDU upon reception of the first RESET PDU; increasing, with the second RLC peer entity, with 1 the second RLC side first HFN and a second RLC side second HFN; transmitting, with the second RLC peer entity, a first RESET ACK PDU with a second RLC side second HFN in response to the first RESET PDU; setting, with the first RLC peer entity, a first RLC side second HFN to a value equal to the second RLC side second HFN contained in the second RESET PDU upon reception of the second RESET PDU; increasing, with the first RLC peer entity, with 1 the first RLC side first HFN and the first RLC side second HFN; transmitting, with the first RLC peer entity, a second RESET ACK PDU with the first RLC side first HFN in response to the second RESET PDU; setting, with the first RLC peer entity, the first RLC side second HFN to a value equal to the second RLC side second HFN contained in the first RESET ACK PDU upon reception of the first RESET ACK PDU; increasing, with the first RLC peer entity, with 1 the first RLC side first HFN and the first RLC side second HFN; setting, with the second RLC peer entity, the second RLC side first HFN to a value equal to the first RLC side first HFN contained in the second RESET ACK PDU upon reception of the first RESET ACK PDU; and increasing, with the second RLC peer entity, with 1 the second RLC side first HFN and the second RLC side second HFN.

The foregoing embodiments and advantages are merely exemplary and are not to be construed as limiting the present invention. The present teaching can be readily applied to other types of apparatuses. The description of the present invention is intended to be illustrative, and not to limit the scope of the claims.

What is claimed is:

1. A method for compensating for synchronization errors comprising:
    sending a first initial synchronization message by a first device to a second device;
    sending a second initial synchronization message by the second device to the first device at substantially the same time as the sending of the first initial synchronization message and before the first synchronization message is received at the second device, wherein the first initial synchronization message and the second initial synchronization message are both RESET PDUs; and
    synchronizing the first device and the second device by compensating for synchronization errors when the first device and the second device both initiate said initial synchronizing messages at substantially the same time.

2. The method of claim 1, wherein the first device and the second device are both wireless devices.

3. The method of claim 2, wherein:
    the first device is a user equipment device; and
    the second device is a universal mobile telecommunications system terrestrial access network device.

4. The method of claim 1, wherein said compensating for synchronization errors comprises canceling the second initial synchronization message.

5. The method of claim 4, wherein the first initial synchronization message comprises first uplink information.

6. The method of claim 5, wherein the uplink information comprises an uplink hyper frame number of the first device.

7. The method of claim 1, wherein said compensating for synchronization errors comprises:
    incrementing upload information and download information in the first device and the second device only if:
    the first device sends the first initial synchronization message to the second device, wherein the first initial synchronization message comprises the upload information, and the second device is set to the upload information;
    the second device sends the second initial synchronization message to the first device prior to receiving the first initial synchronization message, wherein the second initial synchronization message comprises the download information, and the first device is set to the download information; and
    the second device sends a first acknowledgment synchronization message to the first device in response the first initial synchronization message, wherein the first acknowledgement message comprises the download information, and the first device is set to the download information.

8. The method of claim 7, wherein incrementing upload information and download information in the first device and the second device is incrementing upload information and download information in the first device and the second device by 1.

9. The method of claim 7, wherein at least one of:
    the uplink information comprises an uplink hyper frame number of the first device; and
    the downlink information comprises a downlink hyper frame number of the second device.

10. The method of claim 7, wherein
    the first acknowledge synchronization message and the second acknowledge synchronization are both RESET ACK PDUs.

11. The method of claim 1, wherein said compensating for synchronization errors comprises:
    incrementing only upload information in the second device and incrementing only downlink information in the first device only if:
    the first device sends the first initial synchronization message to the second device, wherein the first initial synchronization message comprises the upload information, and the second device is set to the upload information;
    the second device sends the second initial synchronization message to the first device prior to receiving the first initial synchronization message, wherein the second initial synchronization message comprises the download information, and the first device is set to the download information;
    the second device sends a first acknowledgment synchronization message to the first device in response the first initial synchronization message, wherein the first acknowledgement message comprises the download information, and both the uplink information and the downlink information set in the second device are incremented; and
    the first device sends a second acknowledgment synchronization message to the second device in response the second initial synchronization message, wherein the second acknowledgement message comprises the upload information, and both the uplink information and the downlink information set in the first device are incremented;
    the first device is set to the download information upon receipt of the first acknowledgment synchronization message; and
    the second device is set to the uplink information upon receipt of the second acknowledgment synchronization message.

12. The method of claim 11, wherein incrementing the upload information or incrementing the download information is incrementing the upload information or incrementing the download information by 1.

13. The method of claim 11, wherein at least one of:
    the uplink information comprises an uplink hyper frame number of the first device; and the downlink information comprises a downlink hyper frame number of the second device.

14. The method of claim 11, wherein the first acknowledge synchronization message and the second acknowledge synchronization are both RESET ACK PDUs.

15. The method of claim 1, wherein said compensating for synchronization errors comprises:
incrementing only upload information in the second device and incrementing only downlink information in the first device only if:
the first device sends the first initial synchronization message to the second device, wherein the first initial synchronization message comprises the upload information, and the second device is set to the upload information;
the second device sends the second initial synchronization message to the first device prior to receiving the first initial synchronization message, wherein the second initial synchronization message comprises the download information, and the first device is set to the download information;
both the uplink information and the downlink information set in the second device are incremented, the second device sends a first acknowledgment synchronization message to the first device in response the first initial synchronization message, and wherein the first acknowledgement message comprises the incremented download information set in the second device; and
both the uplink information and the downlink information set in the first device are incremented, the first device sends a second acknowledgment synchronization message to the second device in response the second initial synchronization message, wherein the second acknowledgement message comprises the incremented upload information set in the first device, and;
the first device is set to the download information upon receipt of the first acknowledgment synchronization message; and
the second device is set to the uplink information upon receipt of the second acknowledgment synchronization message.

16. The method of claim 15, wherein incrementing upload information or incrementing the download information is incrementing the upload information or incrementing the download information by 1.

17. The method of claim 15, wherein at least one of:
the uplink information comprises an uplink hyper frame number of the first device; and
the downlink information comprises a downlink hyper frame number of the second device.

18. The method of claim 15, wherein
the first acknowledge synchronization message and the second acknowledge synchronization are both RESET ACK PDUs.

19. A system for compensating for synchronization errors comprising:
a first device to send a first initial synchronization message; and
a second device to send a second initial synchronization message to the first device at substantially the same time as the sending of the first initial synchronization message and before the first synchronization message is received at the second device, wherein the first initial synchronization message is a RESET PDU and the second initial synchronization message is a RESET PDU,
wherein the first device and the second device each include means for compensating for synchronization errors during synchronization of the first device and the second device when the first device and the second device both initiate said synchronizing at substantially the same time.

20. The system according to claim 19, wherein the first initial synchronization message and the second initial synchronization message are both RESET PDUs.

21. A failsafe radio link control (RLC) reset method between two RLC peer entities, comprising:
independently determining at both of the two RLC peer entities whether or not a RLC reset is required between the two RLC peer entities;
independently initiating, at substantially the same time, a RLC reset procedure at each of the two RLC peer entities if it is determined by each of the two RLC peer entities that a RLC reset is required; and
synchronizing the two REC peer entities without a synchronization failure.

22. The failsafe RLC reset method of claim 21, wherein each of the two RLC peer entities has a pair of hyper frame numbers (HFNs).

23. The failsafe RLC reset method of claim 22, wherein initiating the RLC reset procedure at each of the two RLC entities includes:
transmitting from a first RLC peer entity of the two RLC entities, a first RESET PDU with a first RLC side first HFN; and
canceling at a second RLC peer entity of the two RLC entities, transmission of a second RESET PDU when the second RLC peer entity receives the first RESET PDU before transmitting the second RESET PDU.

24. The failsafe RLC reset method of claim 23, wherein synchronizing the two RLC peer entities comprises:
setting at the second RLC peer entity, a second RLC side first HFN to a value equal to the first RLC side first HFN contained in the first RESET PDU upon reception of the first RESET PDU;
transmitting from the second RLC peer entity, an RESET ACK PDU with a second RLC side second HFN in response to the first RESET PDU;
increasing by 1 the second RLC side first HFN and a second RLC side second HFN of the second RLC peer entity; and
setting at the first RLC peer entity, a first RLC side second HFN to a value equal to the second RLC side second HFN contained in the RESET ACK PDU upon receipt of the RESET ACK PDU.

25. The failsafe RLC reset method of claim 22, wherein initiating the RLC reset procedure at each of the two RLC entities includes:
transmitting from a first RLC peer entity of the two RLC entities a first RESET PDU with a first RLC side first HFN; and
transmitting from a second RLC peer entity, a second RESET PDU with a second RLC side second HFN before receiving the first RESET PDU.

26. The failsafe RLC reset method of claim 25, wherein synchronizing the two RLC peer entities includes:
setting at the second RLC peer entity, a second RLC side first HFN to a value equal to the first REC side first HFN contained in the first RESET PDU upon receipt of the first RESET PDU;
transmitting from the second RLC peer entity, a first RESET ACK PDU with a second RLC side second HFN in response to the first RESET PDU;

setting at the first RLC peer entity, a first RLC side second HFN to a value equal to the second REC side second HFN contained in the second RESET PDU upon receipt of the second RESET PDU;

transmitting from the first RLC peer entity, a second RESET ACK PDU with the first RLC side first HFN in response to the second RESET PDU;

setting at the first RLC peer entity, the first RLC side second HFN to a value equal to the second RLC side second HFN contained in the first RESET ACK PDU upon receipt of the first RESET ACK PDU;

increasing by 1 the first RLC side first HFN and first RLC side second HFN of the first RLC peer entity;

setting at the second RLC peer entity, the second RLC side first HFN to a value equal to the first RLC side first HFN contained in the second RESET ACK PDU upon receipt of the second RESET ACK PDU; and increasing by 1 the second RLC side first HFN and the second RLC side second HFN respectively at the second RLC peer entity.

27. The failsafe RLC reset method of claim 25, wherein synchronizing the two RLC peer entities includes:

setting at the second RLC peer entity, a second RLC side first HFN to a value equal to the first RLC side first HFN contained in the first RESET PDU upon receipt of the first RESET PDU;

transmitting from the second REC peer entity, a first RESET ACK PDU with a second RLC side second HFN in response to the first RESET PDU;

increasing by 1 the second RLC side first HFN and the second RLC side second HFN respectively at the second RLC peer entity;

setting at the first RLC peer entity, a first RLC side second HFN to a value equal to the second RLC side second HFN contained in the second RESET PDU upon receipt of the second RESET PDU;

transmitting from the first RLC peer entity, a second RESET ACK PDU with a first RLC side first HFN in response to the second RESET PDU;

increasing by 1 the first RLC side first HFN and the first RLC side second HFN at the first RLC peer entity;

setting at the first RLC peer entity, a first RLC side second HFN to a value equal to the second RLC side second HFN contained in the first RESET ACK PDU upon receipt of the first RESET ACK PDU;

increasing by 1 only the first RLC side second HFN at the first RLC peer entity; setting at the second RLC peer entity, the second RLC side first HFN to a value equal to the first RLC side first HFN contained in the second RESET ACK PDU upon receipt of the second RESET ACK PDU; and increasing by 1 only the second RLC side first HFN at the second RLC peer entity.

28. The failsafe RLC reset method of claim 25, wherein synchronizing the two RLC peer entities includes:

setting at the second RLC peer entity, a second RLC side first HFN to a value equal to the first RLC side first HFN contained in the first RESET PDU upon receipt of the first RESET PDU;

increasing by 1 the second RLC side first HFN and a second RLC side second HFN at the second RLC peer entity;

transmitting from the second RLC peer entity, a first RESET ACK PDU with a second RLC side second HFN in response to the first RESET PDU;

setting at the first RLC peer entity, a first REC side second HFN to a value equal to the second RLC side second HFN contained in the second RESET PDU upon receipt of the second RESET PDU;

increasing by 1 the first RLC side first HFN and the first RLC side second HFN at the first RLC peer entity;

transmitting from the first RLC peer entity, a second RESET ACK PDU with the first RLC side first HFN in response to the second RESET PDU;

setting at the first RLC peer entity, the first RLC side second HFN to a value equal to the second RLC side second HFN contained in the first RESET ACK PDU upon receipt of the first RESET ACK PDU;

increasing by 1 the first RLC side first HFN and the first RLC side second HFN respectively at the first RLC peer entity;

setting at the second RLC peer entity, the second RLC side first HFN to a value equal to the first RLC side first HFN contained in the second RESET ACK PDU upon receipt of the second RESET ACK PDU; and increasing by 1 the second RLC side first HFN and the second RLC side second HFN at the second RLC peer entity.

* * * * *